United States Patent
Fouquet et al.

[11] Patent Number: 5,960,131
[45] Date of Patent: Sep. 28, 1999

[54] SWITCHING ELEMENT HAVING AN EXPANDING WAVEGUIDE CORE

[75] Inventors: Julie E. Fouquet, Portola Valley; David K. Donald, Mountain View; Datong Chen; Kok Wai Chang, both of Sunnyvale, all of Calif.

[73] Assignee: Hewlett-Packard Company, Palo Alto, Calif.

[21] Appl. No.: 09/018,772

[22] Filed: Feb. 4, 1998

[51] Int. Cl.$^6$ .................................................. G02B 6/26
[52] U.S. Cl. .................... 385/17; 385/4; 385/16; 385/18
[58] Field of Search ................... 385/15–18, 4, 385/5

[56] References Cited

U.S. PATENT DOCUMENTS

| | | | |
|---|---|---|---|
| 4,505,539 | 3/1985 | Auracher et al. | 350/96.15 |
| 4,988,157 | 1/1991 | Jackel et al. | 385/17 |
| 5,204,921 | 4/1993 | Kanai et al. | 385/17 |
| 5,699,462 | 12/1997 | Fouquet et al. | 385/18 |

FOREIGN PATENT DOCUMENTS

| | | |
|---|---|---|
| 5-88030 | 4/1993 | Japan. |
| 8-94866 | 4/1996 | Japan. |

*Primary Examiner*—Phan T. H. Palmer

[57] ABSTRACT

A switching element that selectively couples a first optical path to a second optical path through an index-matching fluid includes a tapering region along each of the optical paths to achieve high coupling efficiency at both ends of substrate waveguides that form portions of the two optical paths. The two substrate waveguides are separated by a gap that is filled with the index-matching fluid in order to optically couple the two waveguides. The ends of the waveguides located at the gap have relatively large cross sectional areas to promote high coupling efficiency across the gap. For example, the cross sectional dimensions may be approximately 16 $\mu$m×8 $\mu$m at the interior ends of the two substrate waveguides. On the other hand, the exterior ends have significantly smaller cross sectional areas in order to promote high coupling efficiency to optical fibers. For example, the cross sectional dimensions of an external end may be 8 $\mu$m×8 $\mu$m. The substrate waveguides are adiabatically tapered in order to inhibit reflection. In another embodiment, the tapering regions of the two optical paths are formed along the optical fibers, rather than along the substrate waveguides.

19 Claims, 6 Drawing Sheets

SWITCHING ELEMENT HAVING AN EXPANDING WAVEGUIDE CORE

TECHNICAL FIELD

The invention relates generally to optical switching elements and more particularly to switches that require the exchange of signals between optical fibers and substrate waveguides.

BACKGROUND ART

Traditionally, signal exchanges within telecommunications networks and data communications networks have been accomplished by transmitting electrical signals via electrically conductive lines. However, an alternative medium of data exchange is the transmission of optical signals through optical fibers. Equipment for efficiently generating and transmitting the optical signals has been designed and implemented, but the design of optical switches for use in telecommunications and data communications networks is problematic. Data communications networks often utilize packet switching techniques in which information is separated into fixed-length packets that are transmitted and then reassembled at the destination site. An advantage of packet switching is that it efficiently uses the transmission resources of a system. A disadvantage with respect to optical packet transmissions is that the switching equipment is not as well developed as comparable electrical switching equipment. In particular, the absence of easy-to-use optical memory is a major drawback. Optical cross-connect circuit switches are used by telecommunications companies to route high bit-rate signals between optical fibers. They are particularly useful in systems employing wavelength division multiplexing (WDM), in which information capacity is increased by using parallel channels at different wavelengths. Switches of this type are commercially available, but suffer from either large size, poor performance, high price, or a combination of these factors.

U.S. Pat. No. 5,699,462 to Fouquet et al., which is assigned to the assignee of the present invention, describes a switching matrix that may be used for routing optical signals from any one of a number of parallel input optical fibers to any one of a number of parallel output optical fibers. A functionally related matrix of switching elements is described in U.S. Pat. No. 4,988,157 to Jackel et al. A switching element 10 is shown in FIG. 1, while a 4×4 matrix 32 of switching elements is shown in FIG. 2. The optical switch of FIG. 1 is formed on a substrate. The substrate may be a silicon substrate, but other materials may be used. The optical switch 10 includes planar waveguides defined by a lower cladding layer 14, a core 16 and an upper cladding layer 18. The core is primarily silicon dioxide, but with other materials that affect the index of refraction of the core. The cladding layers should be formed of a material having a refractive index that is substantially different from the refractive index of the core material, so that optical signals are guided along the core material.

The core material 16 is patterned to define an input waveguide 20 and an output waveguide 26 of a first waveguide path and to define an input waveguide 24 and an output waveguide 22 of a second waveguide path. A trench 28 is etched through the core material to the silicon substrate. The waveguides intersect the trench at an angle of incidence greater than the critical angle of total internal reflection (TIR) when the trench is filled with a vapor or gas. Thus, TIR diverts light from the input waveguide 20 to the output waveguide 22, unless an index-matching material is located within the gap between the aligned segments 20 and 26. Ideally, the trench 28 is positioned with respect to the four waveguides such that one sidewall of the trench passes directly through the intersection of the axes of the waveguides. In the 4×4 matrix 32 of FIG. 2, any one of four input waveguides 34, 36, 38 and 40 may be optically coupled to any one of four output waveguides 42, 44, 46 and 48. The switching arrangement is referred to as "non-blocking", since any free input fiber can be connected to any free output fiber regardless of what connections have already been made through the switching arrangement. Each of the sixteen optical switches has a trench that causes TIR in the absence of an index-matching liquid, but collinear segments of a particular waveguide path are optically coupled when the gaps between the collinear segments are filled with an index-matching fluid. Trenches in which the waveguide gaps are filled with fluid are represented by fine lines that extend at an angle through the intersections of optical waveguides in the array. On the other hand, trenches in which there is an absence of index-matching fluid at the gaps are represented by broad lines through a point of intersection.

The input waveguide 20 of FIGS. 1 and 2 is in optical communication with the output waveguide 22, as a result of reflection at the empty trench 28. Since all other cross points for allowing the input waveguide 34 to communicate with the output waveguide 44 are in a transmissive state, a signal that is generated at input waveguide 34 will be received at output waveguide 44. In like manner, input waveguide 36 is optically coupled to the first output waveguide 42, the third input waveguide 38 is optically coupled to the fourth output waveguide 48, and the fourth input waveguide 40 is coupled to the third output waveguide 46.

There are a number of available techniques for changing an optical switch of the type shown in FIG. 1 from a transmissive state to a reflective state. In the above-identified patent to Jackel et al., water or a refractive index-matching liquid resides within the gap between waveguides until an electrochemically generated bubble is formed. A pair of electrodes are positioned to electrolytically convert the liquid to gaseous bubbles. A bubble at the gap between collinear waveguides creates an index mismatch and causes light to be reflected at the sidewall of a trench. The bubble can be destroyed by a second pulse of appropriate polarity, thereby removing the is bubble and returning the switch to the transmissive state.

Japanese application No. 6-229802 of Sato et al. (Kokai No. 8-94866) describes the use of heaters to supply and remove index-matching liquid to and from a gap that is intersected by two waveguides. Flow of liquid is controlled by selectively activating heater elements.

Sources of signal loss at a switching matrix include coupling losses at the interfaces between optical fibers and waveguides, transmission losses along the waveguides, and transmission losses as a result of crossing a fluid-filled trench from one waveguide to a collinear waveguide. A conventional optical fiber has a diameter of approximately 8 $\mu$m. In order to control coupling losses, the cores of waveguides may be fabricated to substantially match the diameter of the optical fiber. The above-identified reference to Sato et al. describes fabricating a core layer to have a square cross sectional configuration, with both the thickness and width of the waveguide being approximately 8 $\mu$m. The text of the Jackel et al. patent describes the core layer as having a thickness of approximately 7 $\mu$m, which approximately matches the diameter of a single mode fiber. Abrupt dimensional changes would lead to both signal loss and signal reflection.

The selection of waveguide dimensions to minimize coupling losses at the interfaces between optical fibers and waveguides is not necessarily a desirable selection with respect to optimizing other aspects of the switching function. Consequently, tradeoffs need to be made. Depending upon the width of trenches that intersect the waveguides, wider waveguides may reduce the transmission losses across the fluid-filled gaps. For example, in applications in which higher losses can be tolerated (e.g., data communications), it may be preferable to interconnect standard 8 µm core optical fibers to wider and thicker waveguides, thereby accepting coupling losses in exchange for increased performance provided by having larger cross sectional dimensions at the interface with the trench.

What is needed is an optical switching element that does not sacrifice performance in the selections of waveguide dimensions, gap dimensions and fiber dimensions. That is, what is needed is an optical switching element that provides both low fiber-to-waveguide coupling losses and low transmission losses through a fluid-filled gap between a pair of waveguides.

SUMMARY OF THE INVENTION

A switching element selectively couples a first optical path to a second optical path, wherein each optical path includes an optical fiber coupled to a substrate waveguide and each optical path further includes a tapering region in which the cross sectional area of the optical path decreases with distance from a gap between the two optical paths. In one embodiment, the tapering regions of the optical paths are formed along the waveguides. Each of the two waveguides has an interior end having a first cross sectional area. The interior ends are located at the gap within which optical characteristics are selectively switched to determine when the two optical paths are optically coupled. The first cross sectional area is selected to promote high coupling efficiency across the gap. The waveguides taper to a second cross sectional area that is designed to promote high coupling efficiency to the fibers. In a second embodiment, the tapering regions are formed along the optical fibers. For example, thermally expanded core (TEC) fibers may be used to taper the optical paths from the first cross sectional area to a reduced second cross sectional area.

In many applications, there are advantages to having a relatively wide gap between the two optical paths. For example, if the gap is a portion of a liquid-containing trench in which a bubble is manipulated in order to determine the presence or absence of an index-matching liquid at the gap, the reliability of bubble movement may be greater if the trench width is relatively wide (e.g., 25 µm, as compared to 15 µm). It has been determined that a substantially square waveguide having sides of approximately 16 µm provides low losses in passing an optical signal from the first optical path to the second optical path via the index-matching fluid. However, the relatively large waveguides result in high coupling losses at an abrupt dimensional change when optical signals exit the waveguides into standard single mode fibers, which have core diameters of approximately 7 or 8 µm for 1.55 µm single-mode telecommunications applications. The tapering region of an optical path significantly reduces the adverse effects of the tradeoff between waveguide-to-fiber coupling efficiency and cross-trench coupling efficiency.

The tapering region of an optical path is ideally "adiabatic". That is, the cross sectional area of the tapering waveguide fiber should change slowly over distance, so that the lowest order local normal mode of the waveguide/fiber propagates through the tapering region without a cumulative transfer of power to higher order local normal modes. That way reflection within the tapering region is minimized. In practice, the waveguide width can be photolithographically tapered, while waveguide height remains constant at, for example, approximately 8 µm.

In the second embodiment in which the tapering regions are formed along the optical fibers, TEC fibers may be mounted into ferrules or V-grooves within a silicon substrate to form ribbon connectors that facilitate connection to the substrate that includes the waveguides. Thus, a matrix of switching elements may be formed using the invention. Light coupling from the two TEC fibers at the opposite ends of the ribbon connector can be used to actively align all of the precisely positioned TEC fibers to the precisely positioned substrate waveguides. The ribbon connector can then be epoxied to the waveguide substrate using index-matching epoxy. An advantage of this approach is that a large, symmetrical (e.g., 16 µm×16 µm) waveguide can be used, so that both of the polarization components of an input signal will be treated equally, reducing the potential of polarization-dependent losses.

The advantages of the switching element are achieved without requiring significant changes in the waveguide fabrication approach. In the second embodiment, the tapering region is located along the optical fiber, so that no change in waveguide fabrication is required. As previously noted, the large cross sectional area at the interior ends of the waveguides is desirable for applications in which wide trenches are advantageous. As an alternative to bubble manipulation, a trench may be filled with index-matching fluid or a non-matching fluid (e.g., air), and may include a displaceable mirror that is moved into the gap between the two waveguides to deflect an optical signal to a third waveguide. The movement of the mirror may be in a direction perpendicular to the upper surface of the waveguide or may be in a direction along the length of the trench. If a micromachined actuator is to be used to manipulate the mirror, the width of the trench must be sufficiently large to accommodate the actuator. Thus, similarly to the bubble manipulation, the mirror manipulation imposes requirements on the size of waveguides in order to control losses.

BEST MODE FOR CARRYING OUT THE INVENTION

Figure 3:
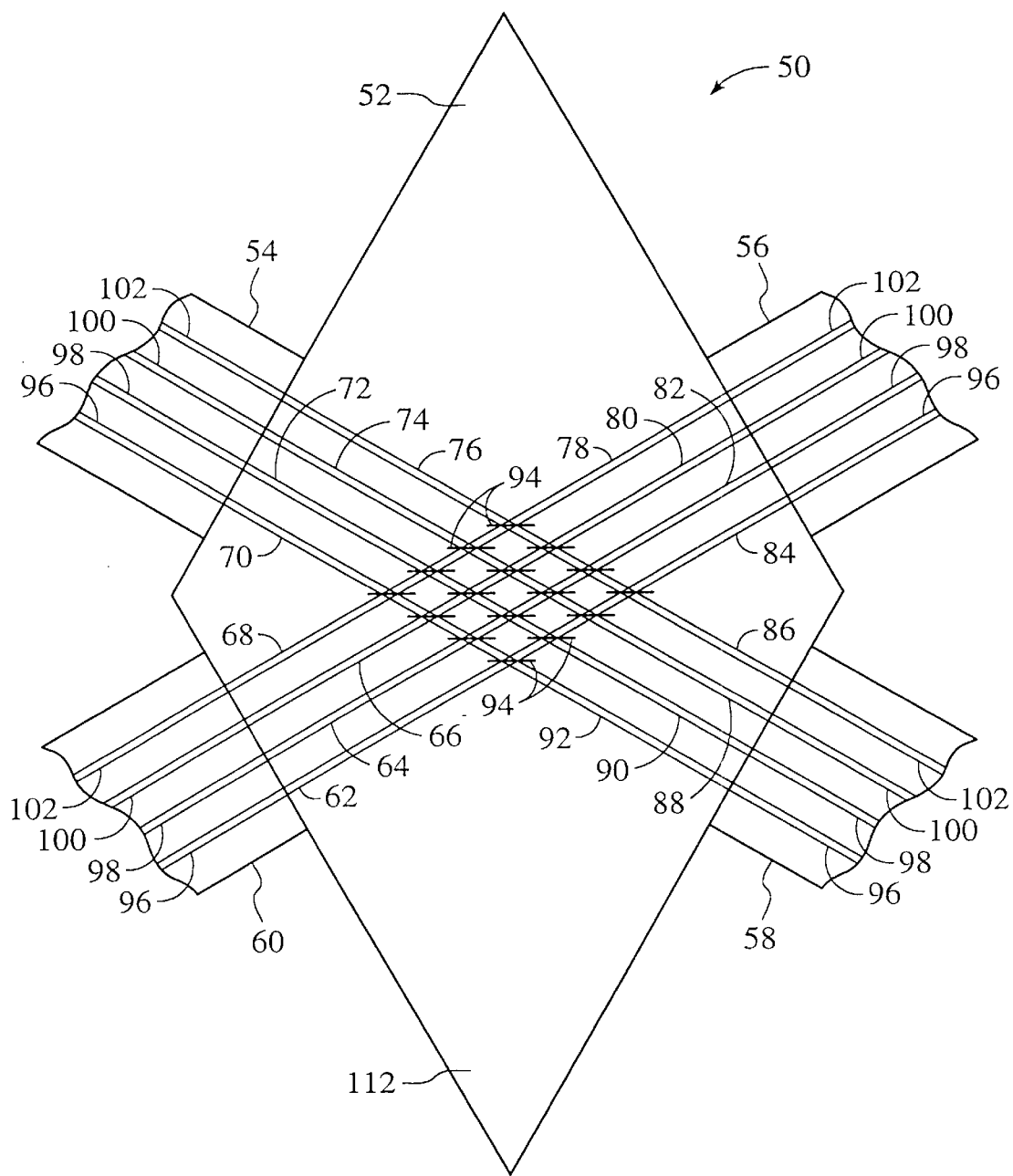
FIG. 3 is a top view of a matrix of switching elements having optical paths that include waveguides with tapering regions in accordance with one embodiment of the invention.

With reference to FIG. 3, a matrix 50 of switching elements includes a waveguide substrate 52 that is attached to four fiber array substrates 54, 56, 58 and 60. The waveguide substrate is preferably a silicon chip, but other materials, such as silica, may be used. An advantage of a silicon substrate is that it facilitates the use of integrated circuit fabrication techniques to form light-transmitting waveguide structures and fluid-feed holes.

Figure 1:
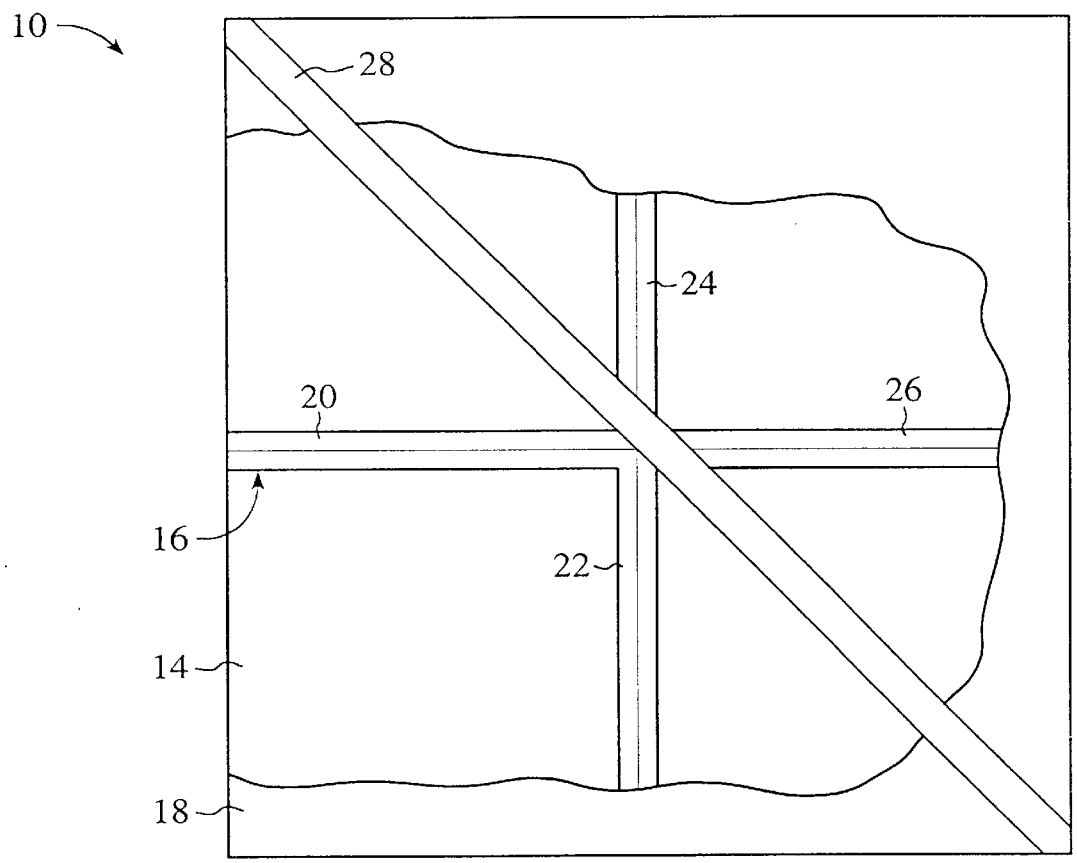
FIG. 1 is a top view of an optical switching element that utilizes total internal reflection in accordance with the prior art.
Figure 2:
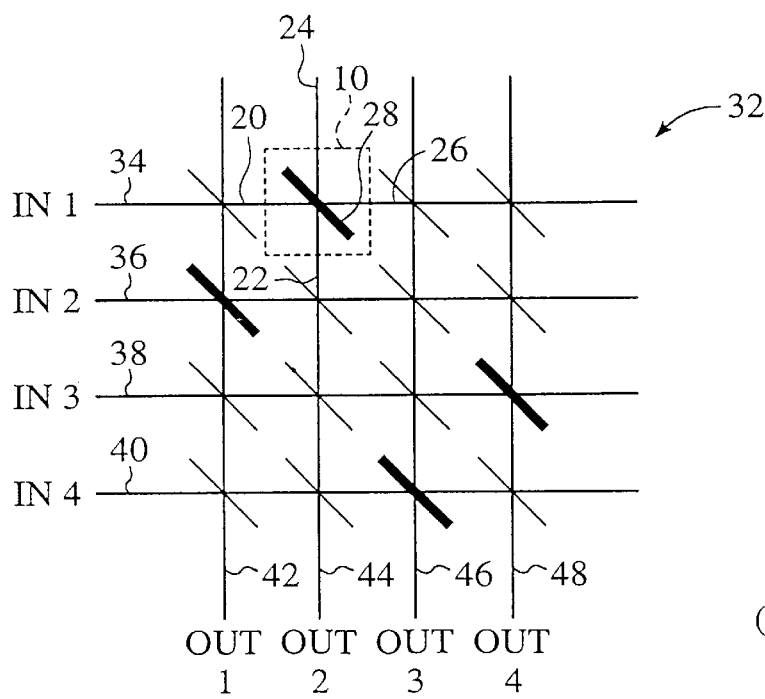
FIG. 2 is a matrix of switching elements of FIG. 1 to allow connection of any one of a number of input waveguides to any one of a number of output waveguides in accordance with the prior art.

The waveguide substrate 52 has a four-sided configuration. The angles of adjacent sides determine the angles of intersection of waveguides with trenches of the type described above with reference to FIG. 1. If the substrate is square and each waveguide is fabricated to extend perpendicularly from an edge of the substrate, each optical switching element will be substantially identical to the switching element 10 shown in FIG. 1. However, the preferred embodiment is one in which the angles of incidence of the waveguide on the trench are in the range of 45° to 60°.

While not shown in the top view of FIG. 3, the interface between the waveguide substrate 52 and each fiber array substrate 54, 56, 58 and 60 can be intentionally tilted at an angle such as eight degrees. This intentional tilt is intended to decrease the magnitude of reflection between waveguides on substrate 52 and optical fibers on substrates 54, 56, 58 and 60.

In FIG. 3, the waveguide substrate 52 includes sixteen input/output waveguides 62, 64, 66, 68, 70, 72, 74, 76, 78, 80, 82, 84, 86, 88, 90 and 92. Additionally, there are twenty-four intermediate waveguides to increase the flexibility of the switching arrangement. In order to optically couple the input/output waveguide 62 to the input/output waveguide 84, an optical signal must pass through three intermediate waveguides and four fluid-filled gaps that are between adjacent waveguides. As previously described with reference to FIG. 1, the gaps may be formed by fabricating trenches at the intersections of waveguides. In FIG. 3, the trenches are represented by lines 94 at the intersections. If the lowermost trench in FIG. 3 does not include index-matching fluid, any input signals from the waveguide 62 will be diverted by total internal reflection to the input/output waveguide 92. On the other hand, if the lowermost trench includes an index-matching fluid at the gap between waveguides, the optical signal from waveguide 62 will propagate through the trench to the next trench. Depending upon the presence or absence of fluid, the input signal from waveguide 62 may be diverted to any one of the four waveguides 86, 88, 90 and 92. This versatility applies to the other three waveguides 64, 66 and 68 that are adjacent to waveguide 62.

Each of the waveguides 62–92 is formed of a core material, such as $SiO_2$ that is doped with Ge or $TiO_2$, to define a first refractive index. Cladding material may also be primarily $SiO_2$, but with a different dopant, such as $B_2O_3$ and/or $P_2O_5$, to define a second refractive index different from the first refractive index. Because of the difference in refractive indices, optical signals are guided along the waveguide cores.

Each of the fiber array substrates 54, 56, 58 and 60 includes four optical fibers 96, 98, 100 and 102. In the embodiment of FIG. 3, the fibers are conventional fibers having a uniformly dimensioned cross section, e.g., a circular cross section having a diameter of approximately 8 $\mu$m. The pitch of the fibers on the fiber array substrates 54–60 matches the pitch of the input/output waveguides 62–92 on the waveguide substrate 52. An acceptable pitch is approximately 250 $\mu$m, but other center-to-center distances may be utilized, such as 500 $\mu$m. In the alignment process, light coupled from the outer two fibers 96 and 102 of a particular fiber array substrate may be utilized in an active alignment procedure. This is possible if the fiber pitch is precisely maintained. A highly accurate positioning of the fibers can be achieved by mounting the individual fibers into ferrules or V-shaped grooves that are photolithographically patterned into a silicon substrate. Under such conditions, the active alignment of the outermost fibers 96 and 92 will result in precise positioning of the intermediate fibers 98 and 100. The fibers and the waveguides can then be fixed in place using an index-matching epoxy. In addition to providing negligible insertion losses, this approach has the advantage of treating both optical polarization components of an input signal or output signal as similarly as possible, reducing the potential of polarization-dependent losses. Alternative methods for fixing and maintaining fiber positions in arrays are also available.

Figure 4:
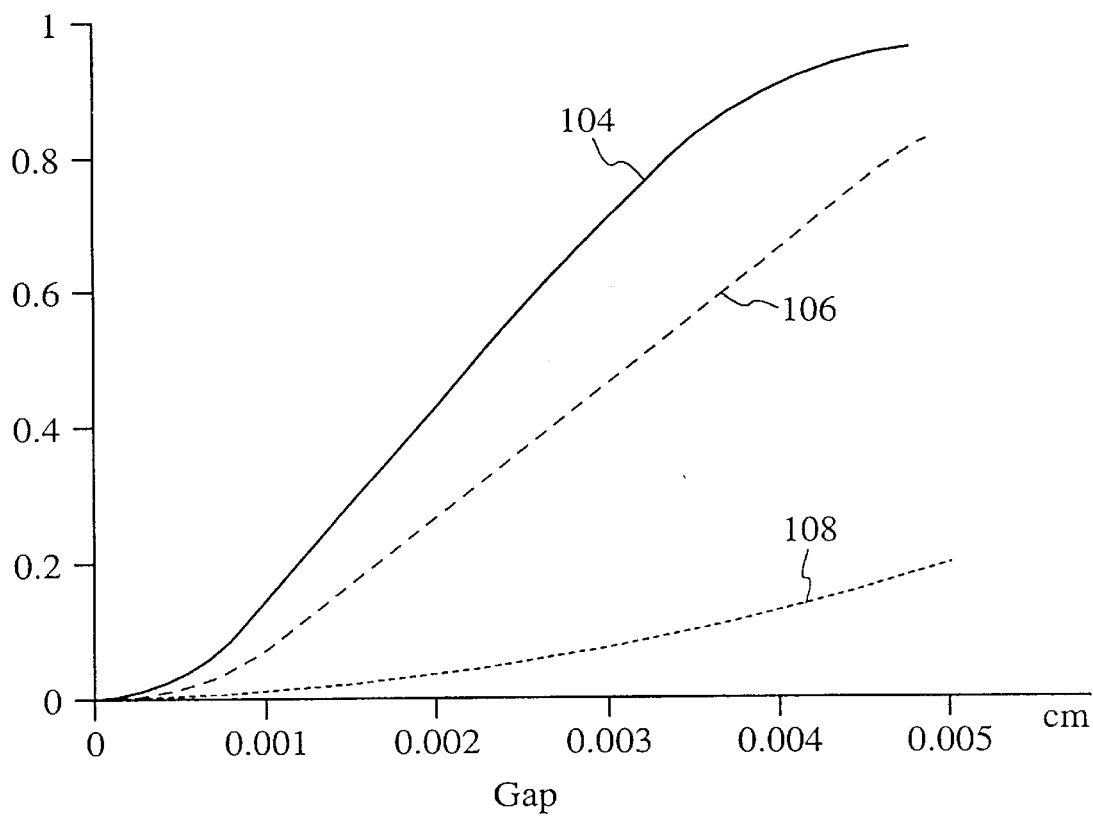
FIG. 4 is a graphical illustration of the proportion of signal energy lost along the highest loss path in a 16×16 switch matrix as a function of the size of the fluid-filled trenches through which the signal propagates, with three different sized waveguides being represented by three curves.

In the ideal, the waveguides 62–92 would have the same cross sectional geometry as the optical fibers 96–102. However, it is not feasible to fabricate substrate waveguides to have a circular cross section. Moreover, the 8 $\mu$m dimension of a conventional fiber is not necessarily optimal for waveguides for which optical signals must propagate through fluid-filled trenches in order to pass from one waveguide to a substantially collinear waveguide. Referring now to FIG. 4, a model was generated in order to determine the proportion of incident light that is lost during transmission through fluid-filled gaps along the highest loss path in a 16×16 switch matrix as a function of the width of the gap. In the model, it was assumed that the waveguide was normally incident to a trench, so that the width of the gap would be equal to the width of the trench. In practice, the incidence is at an oblique angle, so that the physical path length of an optical signal in the trench is greater than the nominal width of the trench. A first curve 104 compares transmission losses as a function of the gap width for a waveguide cross sectional geometry of 8 $\mu$m wide by 8 $\mu$m thick. A second curve 106 was formed for waveguides having a rectangular cross section of 16 $\mu$m wide by 8 $\mu$m thick. A third curve 108 was formed for waveguide structures having square cross sections of 16 $\mu$m by 16 $\mu$m. Clearly, the 16 $\mu$m square waveguides provided the lowest transmission losses across the fluid-filled gap, regardless of the gap width. A somewhat more sophisticated but less reliable program was used to input oblique angles of incidence, and the program indicated that the 16 $\mu$m×8 $\mu$m waveguide geometry would yield more desirable results than those indicated by the second curve 106 in FIG. 4.

Referring again to FIG. 3, each of the input/output waveguides 62–92 is adiabatically tapered from a relatively large cross sectional area at an interior end at the trenches 94 to a relatively small cross sectional area at an interface with one of the optical fibers 96–102. The cross sectional geometry at the interior end is selected to achieve efficient optical coupling across the trenches 94. The cross sectional geometry at the exterior end is selected to achieve high coupling efficiency to the optical fiber. In one embodiment, the adiabatic tapering is from a 16 μm square cross sectional geometry to an 8 μm square cross sectional geometry. However, other embodiments are contemplated. The value of 16 μm is particularly suitable, because it reduces transmission losses to acceptable levels without forcing a significant departure from present waveguide fabrication techniques. Additionally, 16 μm is not so large as to significantly tighten the sidewall angle required for proper sidewall reflection of an optical signal. A 35 μm waveguide would require sidewalls that are closer to perpendicular to the substrate than is achieved using present techniques. For example, the sidewalls would have to be less than 0.50° from the vertical in order to deliver better than a barely acceptable 1.5 dB reflection loss. In practice, a range of active region widths of 4 μm to approximately 35 μm will satisfy these requirements. However, if transmission losses across the gaps are to be brought to an acceptable level, the range is from 6 μm to 35 μm, with the preferred width being approximately 16 μm.

Figure 5:
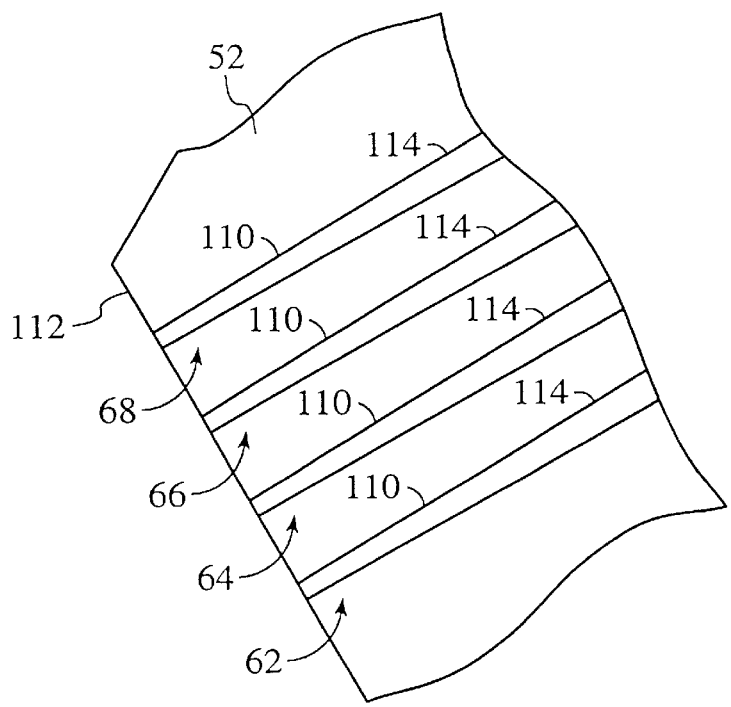
FIG. 5 is a top view of the tapering portions of four waveguides of FIG. 1.

The adiabatic tapering is shown more clearly in FIG. 5. Each of the four waveguides 62–68 includes a tapering region 110 in which the sidewalls of the waveguide diverge with distance from an edge 112 of the waveguide substrate 52. Each waveguide also includes an interior region 114 in which the sidewalls are parallel. Optionally, the region of each waveguide proximate to the edge 112 also has parallel sidewalls, so that the tapering region 110 is an intermediate region between two constant-width regions. The interior region 114 begins when the sidewalls reach the desired distance from each other. The sidewalls may be 16 μm from each other at the interior region and may be 8 μm from each other at the edge 112 of the substrate 52. While not shown in FIG. 5, the thicknesses of the waveguides 62–68 are tapered to correspond to the dimensional variations of width. However, in a more easily fabricated embodiment, the tapering is in a single dimension, from a 16 μm wide×8 μm high waveguide to an 8 μm wide×8 μm high waveguide.

Returning to FIG. 3, the intermediate waveguides between two trenches 94 preferably have a constant cross sectional geometry. Tapering the intermediate waveguides is not beneficial, since the intermediate waveguides are not directly coupled to one of the optical fibers 96–102.

As an alternative to the embodiment of FIGS. 3 and 5, the adiabatic tapering may be implemented at the fiber level. That is, the core of an optical fiber may be expanded to improve the match to a core of a substrate waveguide having a fixed thickness and a fixed width. As another alternative, both the waveguide and the optical fiber may have adiabatically tapered regions.

Figure 7:
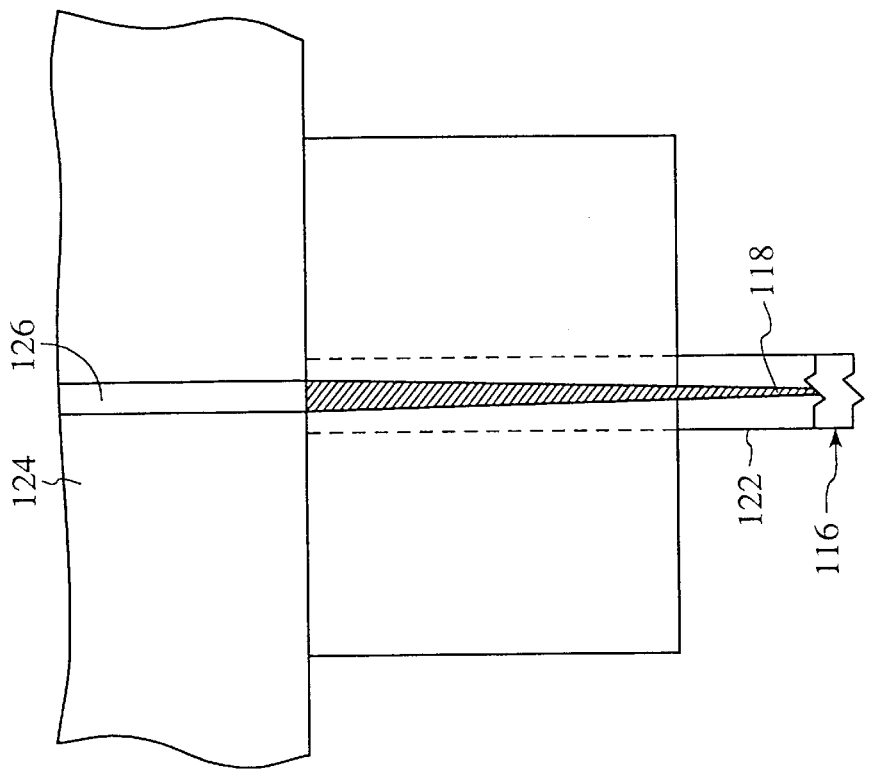
FIG. 7 is a top view of the TEC fiber of FIG. 6 connected to a waveguide in accordance with the second embodiment of the invention.
Figure 6:
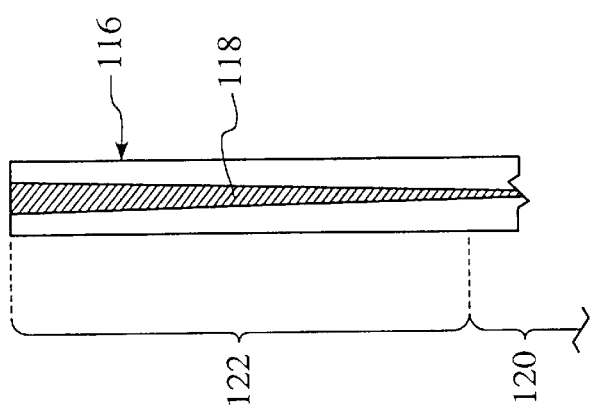
FIG. 6 is a sectional view of a TEC fiber for use in a second embodiment of the invention.

One type of expanded core fiber is referred to as a thermally diffused, expanded-core (TEC) fiber. The structure of a TEC fiber is shown in FIGS. 6 and 7. The TEC fiber 116 has an optical core 118 with a constant diameter along a major portion 120 of the fiber. The major portion 120 is shown as being truncated in FIG. 6. An end portion 122 of the fiber has a core diameter that progressively expands with approach to a waveguide substrate 124 having the constant-width waveguide 126. The expansion factor of the conventional TEC fiber is typically in the range of 2 to 5, and the expansion portion 122 typically has a length in the range of 4 to 6 mm. Suitable waveguide dimensions for providing low coupling loss with the conventional TEC fiber are 16 μm×16 μm. However, any of these parameters can be modified to meet specified requirements.

The expanded optical core 118 at the end portion 122 of the TEC fiber 116 reduces the angle at which light diverges laterally, as compared to narrower-diameter optical fibers. The reduction in the angle at which light diverges is approximately equal to the expansion factor. The reduced lateral spreading of an optical signal emitted from the TEC fiber provides a high coupling efficiency to the fixed-width waveguide 126.

Figure 8:
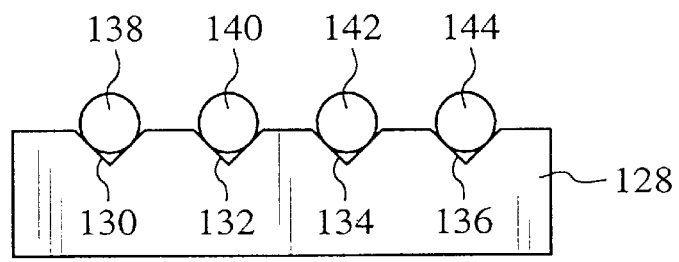
FIG. 8 is an end view of four optical fibers seated within a silicon substrate for optical coupling to the waveguides of switching elements in accordance with the invention.

A preferred embodiment of precisely aligning either TEC fibers or fixed-diameter fibers to a substrate will be described with reference to FIGS. 8 and 9. A semiconductor substrate, such as a silicon wafer 128, is etched to form V-shaped grooves 130, 132, 134 and 136. Conventional integrated circuit fabrication techniques may be utilized. For example, the grooves may be formed photolithographically, using a mask to define the grooves and using a chemical etchant. While not critical, the angle of one wall of a groove relative to the other wall is preferably 70.5°. Preferably, the protective coating is removed from the optical fibers 138, 140, 142 and 144. The fiber cores without the coating material are then placed within the grooves. The use of silicon processing techniques enables a precise center-to-center spacing of the fiber cores. Tolerances of less than 1 micron are achieved. Thus, the pitch of the cores may be fabricated to precisely match the pitch of waveguides.

Figure 9:
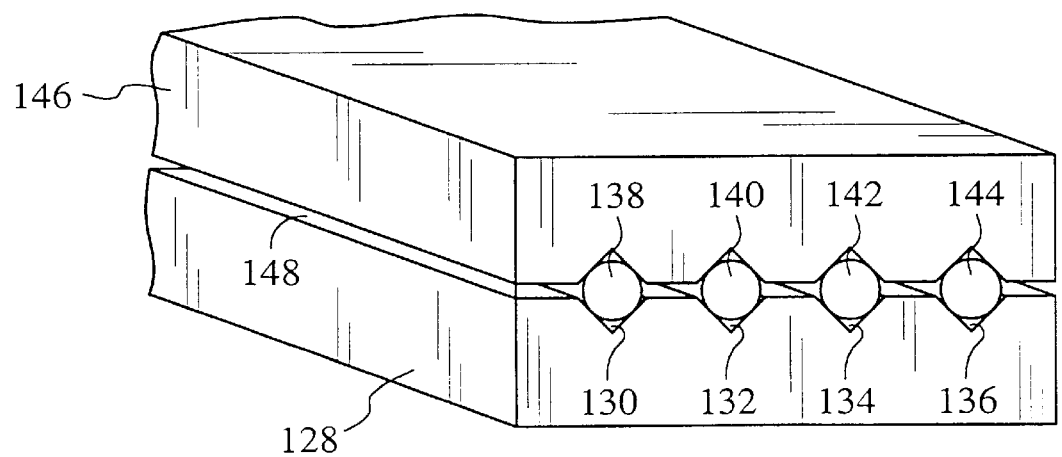
FIG. 9 is a perspective view of the structure of FIG. 8 with a top silicon substrate trapping the optical fibers.

In FIG. 9, a second silicon wafer 146 having a corresponding array of V-shaped grooves is fixed to the lower silicon wafer 128 by a layer of adhesive 148. The use of an adhesive layer is not critical. Alternatively, wafer bonding may be used to attach the two silicon wafers. Silicon V-groove alignment of single-mode fibers and multi-mode fibers is known in the art.

An advantage of silicon micromachining to provide submicron tolerances of alignment of TEC or conventional fibers is that all of the fibers are brought into registration with a similarly fabricated array of substrate waveguides merely by aligning the two end fibers to two end waveguides. For example, in FIG. 3, the fibers 96–102 on the fiber array substrate 60 may be aligned with the waveguides 62–68 by achieving registration of the fiber 96 with the waveguide 62 and the fiber 102 with the waveguide 68. The benefits of this alignment process are increased with increases in the number of fibers and waveguides.

One embodiment of the operation of a switching element will be described with reference to FIGS. 10 and 11. In this embodiment, there are two microheaters 150 and 152 that control the position of a bubble 154 within a fluid-containing trench 156. The fluid within the trench has a refractive index that substantially matches the refractive index of core material of four waveguides 158, 160, 162 and 164. An acceptable liquid is a combination of isopropyl alcohol and glycerol. Another acceptable liquid is M-pyrol.

Figure 10:
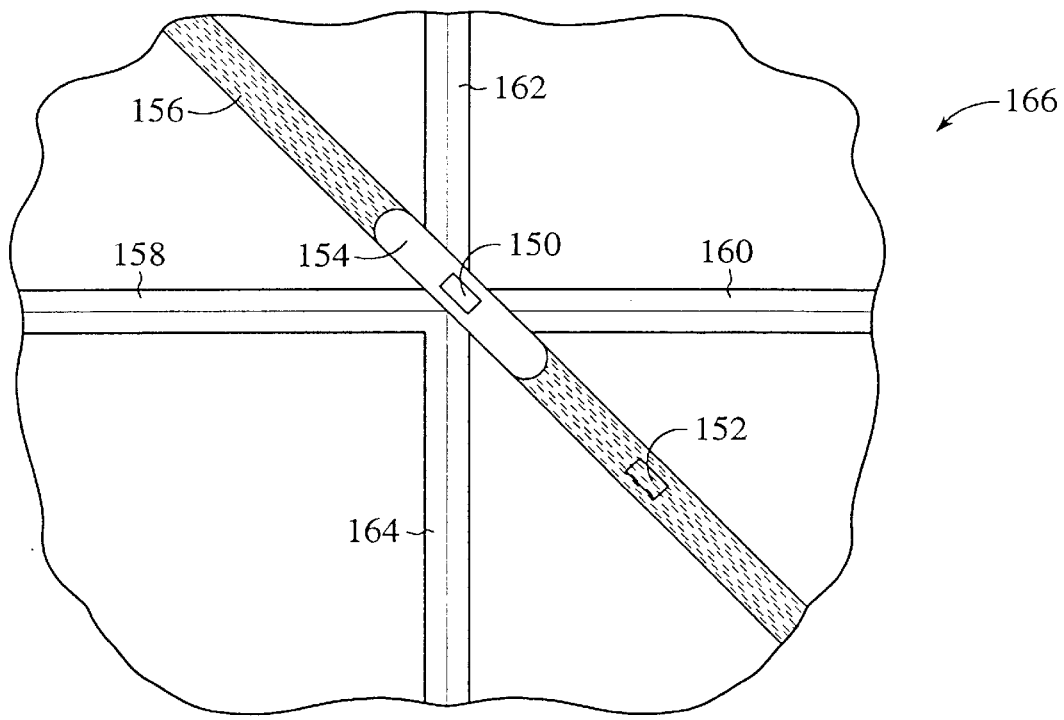
FIG. 10 is a top view of a switching element using bubble manipulation techniques to switch between a reflecting state and a transmitting state.
Figure 11:
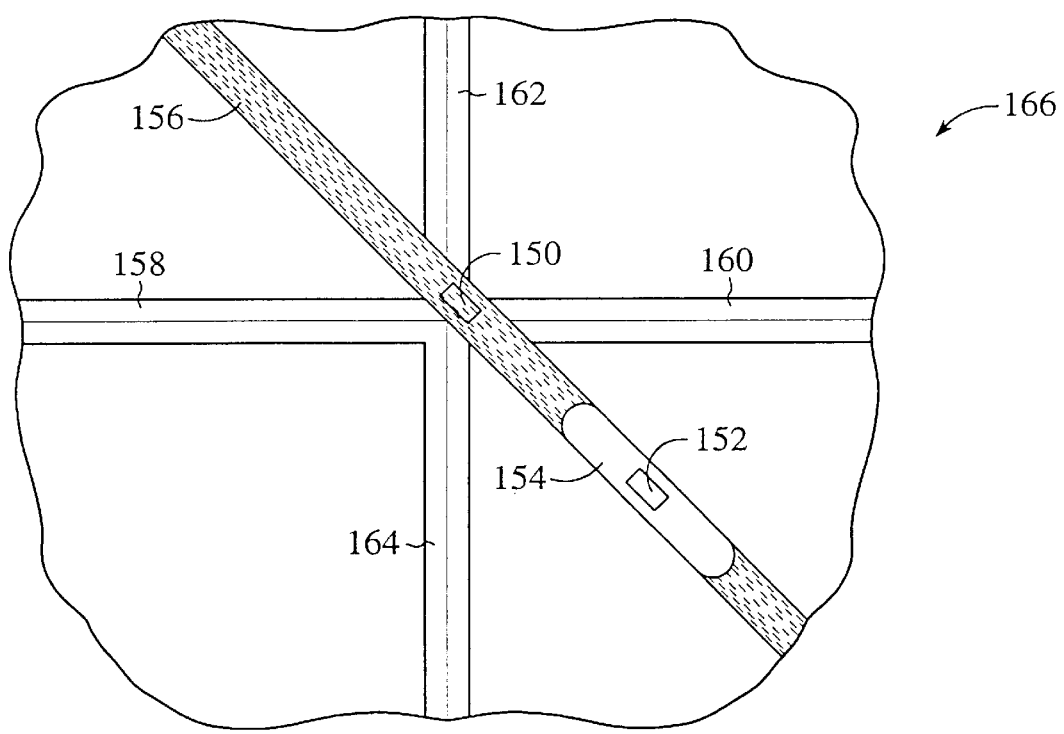
FIG. 11 is a top view of the switching element of FIG. 10 in a transmitting state.

In the operation of the switching element 166 of FIGS. 10 and 11, one of the microheaters 150 and 152 is brought to a temperature sufficiently high to form a gas bubble. Once formed, the bubble 154 can be maintained in position with a smaller current to the microheater. In FIG. 10, the bubble is located at the intersection of the four waveguides 158–164. Consequently, an input signal along waveguide 158 will encounter a refractive index mismatch upon reaching the trench 156. TIR causes the input signal to be diverted to the output waveguide 164. Thus, the switching element is shown in a reflecting state in FIG. 10. The activation of the microheater 150 pins the bubble at the intersection, so that the reflecting state is maintained as long as the microheater is activated.

In FIG. 11, the microheater 150 at the intersection of the waveguides 158–164 has been deactivated and the second microheater 152 has been activated. The bubble 154 is strongly attracted to the activated microheater. This allows index-matching liquid to fill the gap at the intersection of the waveguides. The switching element is in a transmitting state, since the input waveguide 158 is optically coupled to the collinear waveguide 160 and the input waveguide 162 is optically coupled to the collinear waveguide 164.

As an alternative to using the manipulation of a bubble to switch a switching element from a reflecting state to a transmitting state, a mirror may be used. The mirror may be manipulated within a fluid-filled trench. For the default transmitting state, the trench is filled with refractive index-matching fluid and the mirror resides away from the cross point of the waveguides. In order to deflect a beam from an input waveguide to a crossing waveguide, the mirror is inserted into the trench at the cross point. In this embodiment, the trench should be slightly relocated relative to the positions shown in FIGS. 10 and 11. The mirror should be displaceable into the cross point of the axes of the four waveguides, rather than having a trench sidewall being located at this cross point.

The mirror can be moved into and away from the cross point by inducing mirror movement in a direction perpendicular to the upper surface of the waveguide substrate. Alternatively, the motion of the mirror may be parallel to the upper surface of the waveguide substrate. For embodiments in which the motion is perpendicular to the substrate surface, implementation may be achieved by means of a modified multi-pin dot matrix printer engine. The pin spacing for such printer engines is typically greater than the preferred spacing between switching elements, e.g., 250 $\mu$m spacing. Thus, it may be necessary to expand the waveguide structure to match the pin spacing of the printer engine. Alternatively, recently available micro-electromechanical systems (MEMS) actuators are displaceable in a direction perpendicular to the substrate surface and may be used to move the mirror perpendicular to the top surface of the substrate.

More conventional MEMS actuators may be used to manipulate the mirror in the direction parallel to the axis of the trench. Such actuators can function in the presence of a non-conducting fluid, such as the refractive index-matching fluids used in optical switching elements of the type described above. Current electrostatic actuator technology is limited to approximately a 25 $\mu$m range of motion, which may not be adequate to remove a small mirror from a 32 $\mu$m-long intersection length along the trench for crossing 16 $\mu$m-wide waveguides. Thus, this second approach will become more attractive when either improvements are made to provide additional "throw" for electrostatic actuators or a mirror and actuator combination is fabricated to fit within a trench that is approximately 12.5 $\mu$m wide or less, so that the mirror need not move more than 25 $\mu$m.

While the invention has been described and illustrated as having index-matching fluid within the trench, other embodiments have been contemplated. Trenches may house displaceable mirrors within air, i.e., a fluid that is a poor index match with the waveguides. The presence or absence of a mirror within a gap at the intersection of two or more waveguides will then determine whether waveguides are optically coupled. In this embodiment, the angle of incidence of the waveguides on the trench should not be one that induces total internal reflection in the absence of an index-matching fluid. The concern with this embodiment is that it is difficult to control crosstalk, since a small fraction of the light will be reflected at the waveguide/air interface, unless it is anti-reflection coated, and it is difficult to deposit anti-reflection coatings on the vertical trench sidewalls. However, the spacing between the mirror and the waveguide/air interface can be chosen so as minimize the amount of light reflected off the interface that is coupled into the waveguide core along the reflected path.

What is claimed is:

1. A switching element comprising:

a substrate having a surface;

first and second light-transmitting waveguides extending along said surface to a gap and being positioned such that optical coupling between said first and second waveguides is dependent upon optical characteristics exhibited within said gap, said first and second waveguides each having an interior end at said gap and having an exterior end, each of said interior ends having a first cross sectional area;

means for switching said optical characteristics exhibited within said gap from a first state in which said first and second waveguides are optically coupled and a second state in which said first and second waveguides are generally isolated;

a first optical fiber coupled to said exterior end of said first waveguide to form a first optical path that intersects said gap; and a second optical fiber coupled to said exterior end of said second waveguide to form a second optical path that intersects said gap;

each of said first and second optical paths having a tapering region in which a cross sectional area of said tapering region decreases gradually from said first cross sectional area to a reduced cross sectional area.

2. The switching element of claim 1, wherein said tapering regions of said first and second optical paths are located along said first and second optical fibers.

3. The switching element of claim 2, wherein said first and second optical fibers are thermally expanded core (TEC) fibers, said tapering regions being near interfaces of said TEC fibers with said exterior ends of said first and second waveguides.

4. The switching element of claim 3, wherein said first and second waveguides have generally consistent cross sectional geometries from said interior ends to said exterior ends.

5. The switching element of claim 1 wherein said interior ends of said first and second waveguides have substantially square cross sectional configurations having widths and heights in the range of 6 $\mu$m to 35 $\mu$m.

6. The switching element of claim 5 wherein said interior ends have cross sectional dimensions of approximately 16 $\mu$m 33 16 $\mu$m.

7. The switching element of claim 5 wherein said tapering regions are located along said first and second waveguides, said widths being tapered along said tapering regions while said heights remain substantially constant.

8. The switching element of claim 1 wherein said tapering regions of said first and second optical paths are located along said first and second waveguides.

9. The switching element of claim 8 wherein a measure of said reduced cross sectional area generally corresponds to measures of cross sectional areas of said first and second optical fibers, thereby achieving relatively low coupling losses between said first waveguide and said first optical fiber and between said second waveguide and said second optical fiber.

10. The switching element of claim 1 wherein geometries of said tapering regions define generally adiabatic expansion of said first and second optical paths with approach to said gap.

11. An optical routing matrix comprising:

a waveguide substrate having a plurality of trenches on a surface;

an array of first optical paths along said surface, each first optical path intersecting at least one trench and including a first end waveguide segment, said first end waveguide segments being in parallel alignment;

an array of second optical paths along said surface, each second optical path intersecting at least one trench proximate to one of said first optical paths and including a second end waveguide segment, said second end waveguide segments being in parallel alignment;

a fluid selectively movable relative to said trenches, said fluid having a refractive index corresponding to a refractive index of said first and second end waveguide segments such that optical coupling between said first and second optical paths is dependent upon presence or absence of said fluid at intersections of said first and second optical paths with said trenches;

an array of expanded core first fibers coupled to said first end waveguide segments, said first fibers having fiber cores that expand with approach to said first end waveguide segments such that coupling losses between said first fibers and said first optical paths are controlled; and an array of expanded core second fibers coupled to said second end waveguide segments, said second fibers having fiber cores that expand with approach to said second end waveguide segments such that coupling losses between said second fibers and said second optical paths are controlled.

12. The optical routing matrix of claim 11 wherein said waveguide substrate is a first substrate formed of a material compatible with photolithographic fabrication techniques and said first and second optical paths are formed of patterned layers on said first substrate, said first fibers being seated on a second substrate to define a pitch matching a pitch of said first end waveguide segments.

13. The optical routing matrix of claim 12 wherein said second substrate is formed of a material compatible with photolithographic techniques, said second substrate including parallel V-shaped grooves having said pitch of said first fibers, each of said first fibers being seated in one of said V-shaped grooves.

14. The optical routing matrix of claim 11 wherein at each interface of one of said waveguide segments with one of said fibers, said waveguide segment having a cross sectional area that is generally equal to the cross sectional area of said fiber.

15. The optical routing matrix of claim 11 wherein said first and second fibers are TEC fibers having fiber cores that each expand to have a cross sectional area generally corresponding to a cross sectional area of each said first and second end waveguide segments.

16. A switching element comprising:

a substrate having a surface;

first and second light-transmitting waveguides formed of at least one patterned layer on said surface, said first and second waveguides each having an interior end at a gap, said interior ends being disposed such that optical coupling of said first and second waveguides is dependent upon presence or absence of a fluid in said gap, where said fluid has a refractive index substantially matching a refractive index of said at least one patterned layer, each of said first and second waveguides having an exterior end opposite to said interior end and having a controlled expansion of cross sectional area such that said exterior ends have reduced cross sectional areas relative to said interior ends;

a first optical fiber optically coupled to said first waveguide at said exterior end of said first waveguide; and a second optical fiber optically coupled to said second waveguide at said exterior end of said second waveguide.

17. The switching element of claim 16 wherein said first and second waveguides have four-sided cross sections, with each side being in the range of 6 μm to 35 μm at said interior ends and being in the range of 6 μm to 9 μm at said exterior ends.

18. The switching element of claim 17 wherein each said side is approximately 16 μm at said interior end.

19. The switching element of claim 16 wherein said first and second waveguides taper to a cross section selected to promote efficient coupling to said first and second optical fibers.

* * * * *